US012804041B2

(12) United States Patent
Mohen et al.

(10) Patent No.: US 12,804,041 B2
(45) **Date of Patent: *Nov. 17, 2026**

(54) METHOD AND SYSTEM FOR USING DYNAMIC CONTENT TYPES

(71) Applicant: Open Text Corporation, Waterloo (CA)

(72) Inventors: Michael Mohen, Columbia, MD (US); Jeroen M. Van Rotterdam, Fort Lauderdale, FL (US); David Humby, Richmond (CA); Satyapal P. Reddy, San Ramon, CA (US)

(73) Assignee: Open Text Corporation, Waterloo (CA)

( * ) Notice: Subject to any disclaimer, the term of this patent is extended or adjusted under 35 U.S.C. 154(b) by 87 days.

This patent is subject to a terminal disclaimer.

(21) Appl. No.: 18/961,234

(22) Filed: Nov. 26, 2024

(65) Prior Publication Data

US 2025/0094383 A1 Mar. 20, 2025

Related U.S. Application Data

(63) Continuation of application No. 17/854,833, filed on Jun. 30, 2022, now Pat. No. 12,197,383, which is a continuation of application No. 16/370,397, filed on Mar. 29, 2019, now Pat. No. 11,416,445, which is a continuation of application No. 14/755,858, filed on Jun. 30, 2015, now Pat. No. 10,289,686.

(51) Int. Cl.
*H04L 67/1097* (2022.01)
*G06F 16/11* (2019.01)
*G06F 21/60* (2013.01)
*H04L 9/40* (2022.01)

(52) U.S. Cl.
CPC ........ *H04L 67/1097* (2013.01); *G06F 16/122* (2019.01); *G06F 21/604* (2013.01); *H04L 63/105* (2013.01)

(58) Field of Classification Search
CPC . H04L 67/1097; H04L 63/105; G06F 16/122; G06F 21/604
See application file for complete search history.

(56) References Cited

U.S. PATENT DOCUMENTS

2003/0099237 A1* 5/2003 Mitra ...................... H04L 45/44 370/393
2003/0232616 A1* 12/2003 Gidron .................. H04M 15/00 455/406
2011/0197124 A1* 8/2011 Garaventa ............ G06F 16/972 715/234

* cited by examiner

*Primary Examiner* — Cindy Nguyen
(74) *Attorney, Agent, or Firm* — Sprinkle IP Law Group

(57) ABSTRACT

In general, embodiments of the technology relate to a method and system for implementing a dynamic content type (DCT) in a content management system. More specifically, embodiments of the technology relate to using a DCT in order to change and/or extend the functionality of the content management system.

20 Claims, 6 Drawing Sheets

METHOD AND SYSTEM FOR USING DYNAMIC CONTENT TYPES

CROSS-REFERENCE TO RELATED APPLICATIONS

This is a continuation of, and claims a benefit of priority under 35 U.S.C. § 120 from, U.S. patent application Ser. No. 17/854,833, filed Jun. 30, 2022, issued as U.S. Pat. No. 12,197,383, entitled "METHOD AND SYSTEM FOR USING DYNAMIC CONTENT TYPES," which is a continuation of, and claims a benefit of priority under 35 U.S.C. § 120 from, U.S. patent application Ser. No. 16/370,397, filed Mar. 29, 2019, issued as U.S. Pat. No. 11,416,445, entitled "METHOD AND SYSTEM FOR USING DYNAMIC CONTENT TYPES," which is a continuation of, and claims a benefit of priority under 35 U.S.C. § 120 from, U.S. patent application Ser. No. 14/755,858, filed Jun. 30, 2015, issued as U.S. Pat. No. 10,289,686, entitled "METHOD AND SYSTEM FOR USING DYNAMIC CONTENT TYPES," all of which are fully incorporated by reference herein.

BACKGROUND

Significant amounts of content is stored in content repositories. The access and manipulation of this content is typically limited to pre-defined constructs and/or methods. When attempts are made to modify the pre-defined constructs and/or methods, such attempts require significant resources and time to implement.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for implementing a dynamic content type (DCT) in a content management system. More specifically, embodiments of the technology relate to using a DCT in order to change and/or extend the functionality of the content management system such that the manner in which actions may be performed on objects and the results of performing actions on the objects may vary based on the context of the request that specified the action. Said another way, in one or more embodiments of the technology, a first request to perform an action on an object and a second request to perform the same action on the same object may generate different results based on the context of the first request and the second request.

Figure 1:
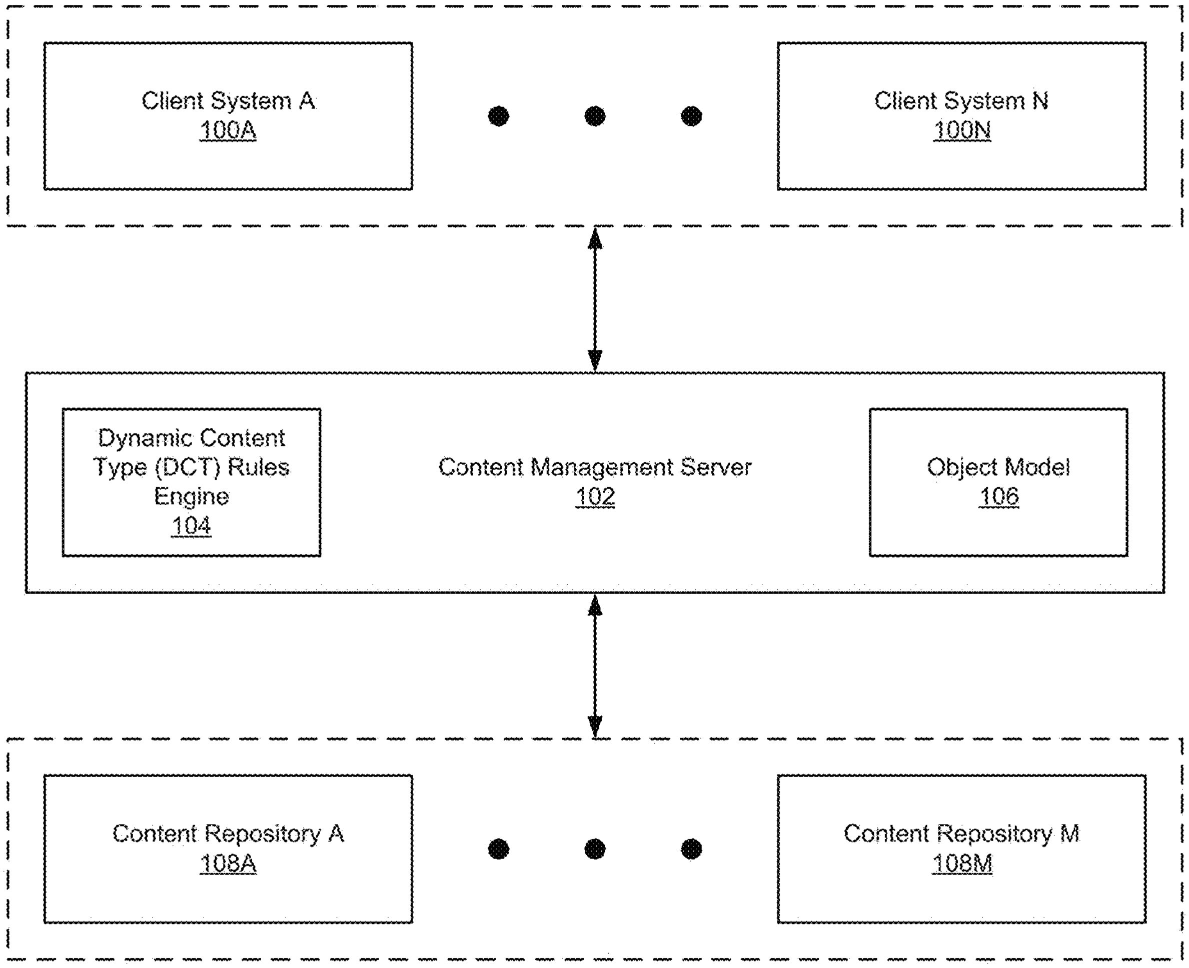
FIG. 1 shows an exemplary system in accordance with one or more embodiments of the technology.

FIG. 1 shows an exemplary system in accordance with one or more embodiments of the technology. The system includes one or more client systems (100A, 100N), a content management server (102), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 6) that includes functionality to issue requests to the content management server (102) and to receive a corresponding response(s) from the content management server after the request has been serviced.

In one embodiment of the technology, each client system may be referred to as a platform, where the platform includes the combination of hardware and software (including the operating system, virtual machines, etc. but excluding applications) executing on the hardware. Each client system may also include one or more applications, where the applications are executing on the platform. In one embodiment of the technology, each platform and/or application may be characterized as public (e.g., the platform is operating on a public computing network or is a publicly accessible computing system) or private (e.g., the platform is operating on a private computing network (e.g., an internal company network) or is a computing system that is provisioned by a company (or another legal entity) for use by the company's employee). Additionally, or alternatively, the platform and/or application may also be characterized based on the level of security measures (e.g., encryption, multi-factor authentication, secure communication protocols, etc.) implemented in the platform and/or application (e.g., a rating scale of 1-5 may be used where 1 is unsecure and 5 is the highest level of security). Each platform and/or application may be characterized using other characterization schemes without departing from the technology. Further, each platform and/or application may be characterized using a combination of characterization schemes (e.g., a platform may be characterized as private, level 3 security).

Figure 4:
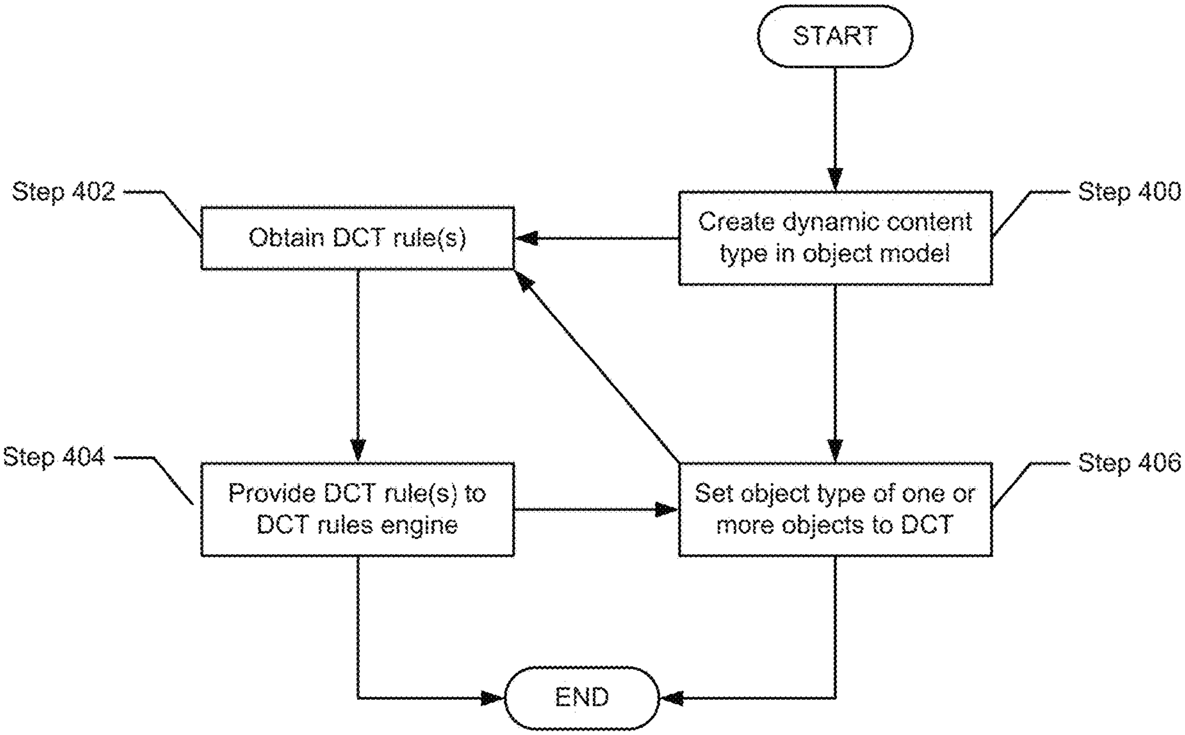
FIG. 4 shows a method for configuring a system to use dynamic content types in accordance with one or more embodiments of the technology.

Continuing with the discussion of FIG. 1, the content management server includes functionality to perform the method shown in FIG. 4. Further, the content management server may include functionality to receive requests from one or more client's systems and to service such requests using the DCT rules engine (104) and the object model (106). The content management server may also include functionality to perform various actions (e.g., read, write, delete, modify, etc.) on the objects stored in the content repositories when servicing requests from the client systems (see e.g., FIG. 5). In one embodiment of the technology, the DCT rules engine (104) includes functionality to identify the appropriate DCT rule to use to service a request and, at least in part, service the request using the identified DCT rule (see e.g., FIG. 5). In one embodiment of the technology, the object model (106) specifies the object types that are supported by the content management service and how the management service is to interact with such objects (based on their object type). With respect to the DCT, the object model may specify that the content management service supports the DCT and may also specify that the processing of objects with an object type of DCT is determined, at least in part, by the DCT engine.

In one embodiment of the technology, the DCT engine may implement one or more DCT rules. The DCT engine (or, more generally, the content management service) may include functionality to store and manage the DCT rules. Additional detail about the DCT rules is provided in FIG. 3.

In one embodiment of the technology, the content management service includes functionality to determine, obtain, and/or store the characterization of the platforms and/or applications with which it is interacting. Such information may then be used to perform at least the functionality described in FIG. 5.

Figure 5:
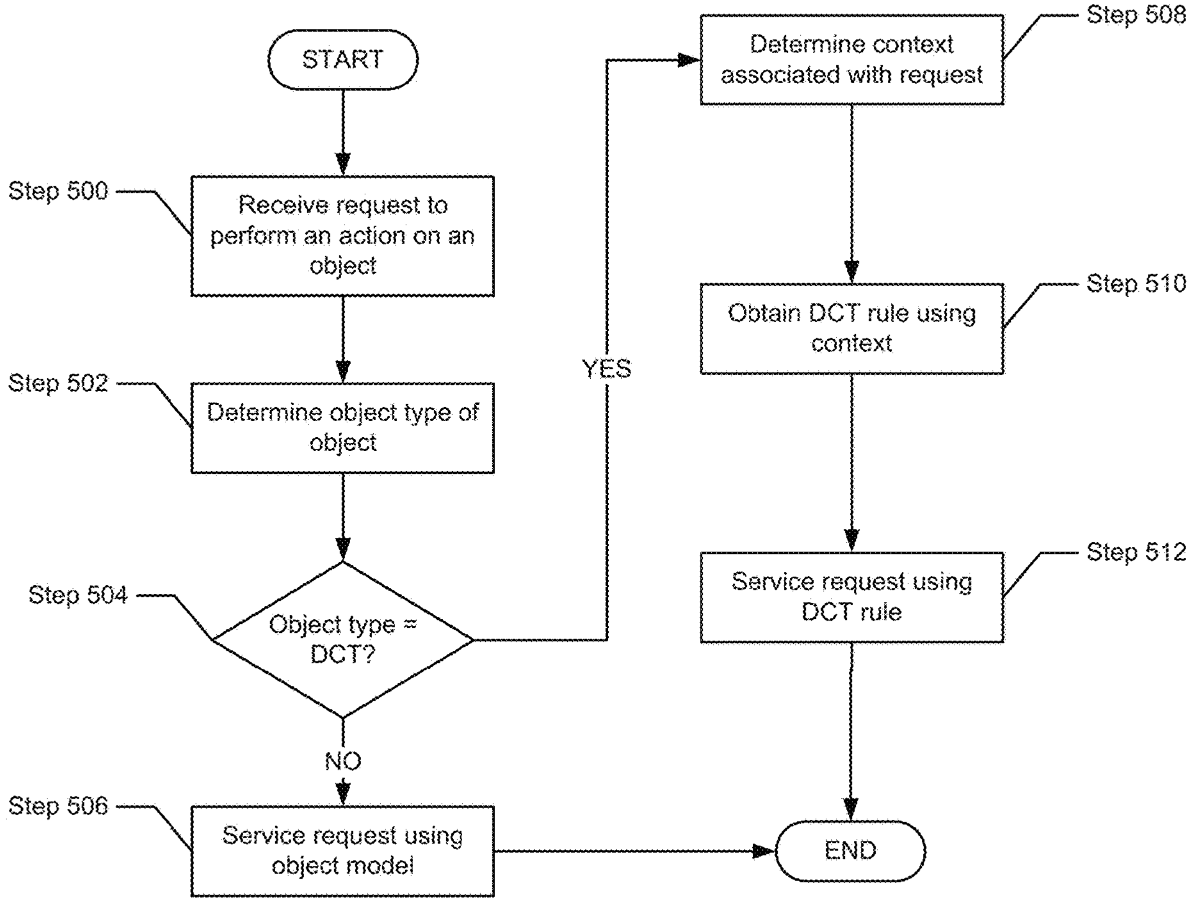
FIG. 5 shows a method for servicing requests in accordance with one or more embodiments of the technology.
Figure 6:
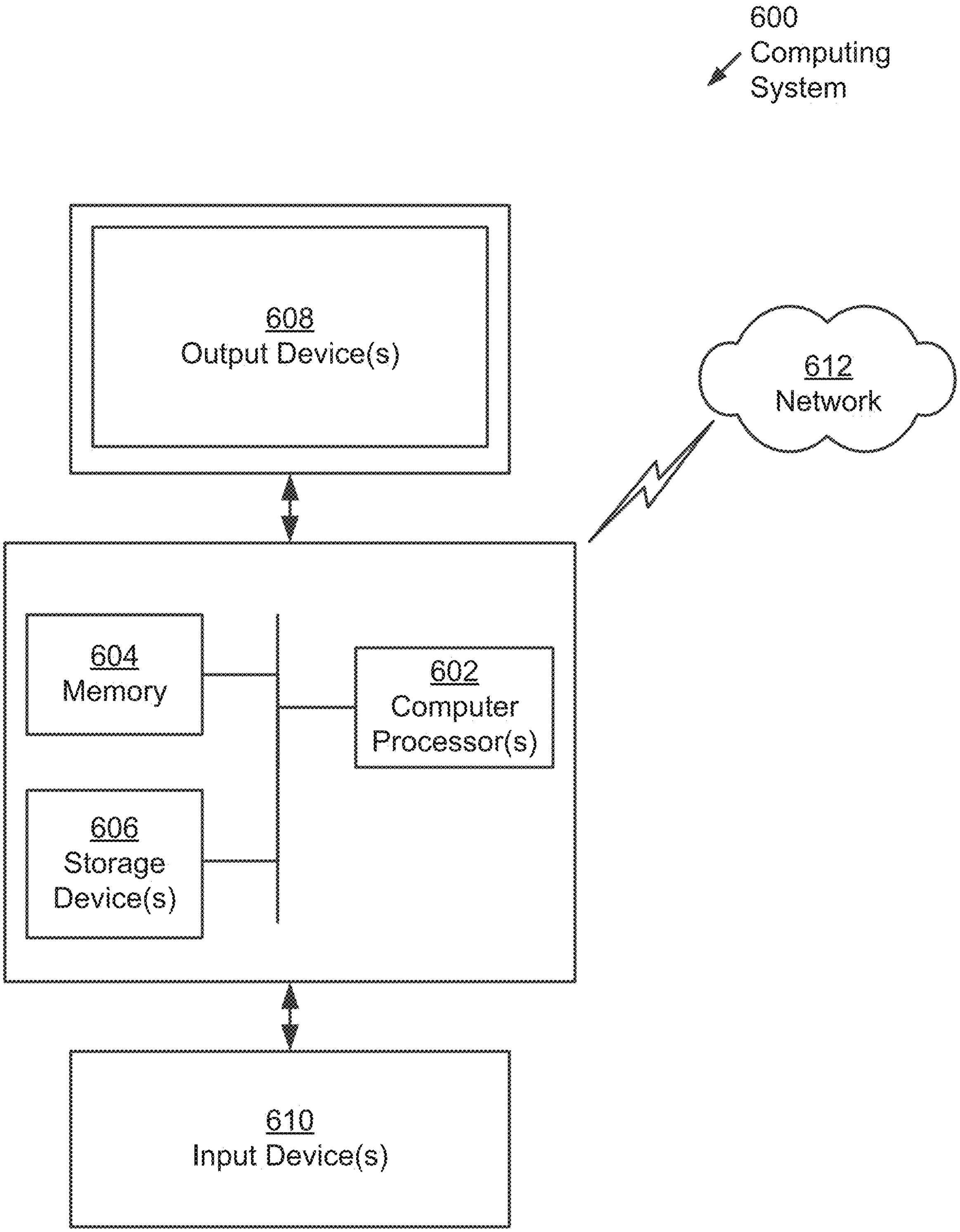
FIG. 6 shows a computing system in accordance with one or more embodiments of the technology.

The content management server may be implemented using one or more computing systems (see e.g., FIG. 6). Additional detail about the operation of the content management server is provided in FIGS. 4 and 5.

In one embodiment of the technology, each content repository (108A, 108M) includes persistent storage (e.g., solid state storage, magnetic storage, optical storage, any other type of persistent storage or any combination thereof) in which objects (see e.g., FIG. 2) are stored.

Continuing with the discussion of the content repositories, each of the content repositories may store objects using any known or subsequently discovered mechanism. The following describes various examples of the mechanisms that may be used to store objects. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

The technology is not limited to the architecture of the system shown in FIG. 1.

Figure 2:
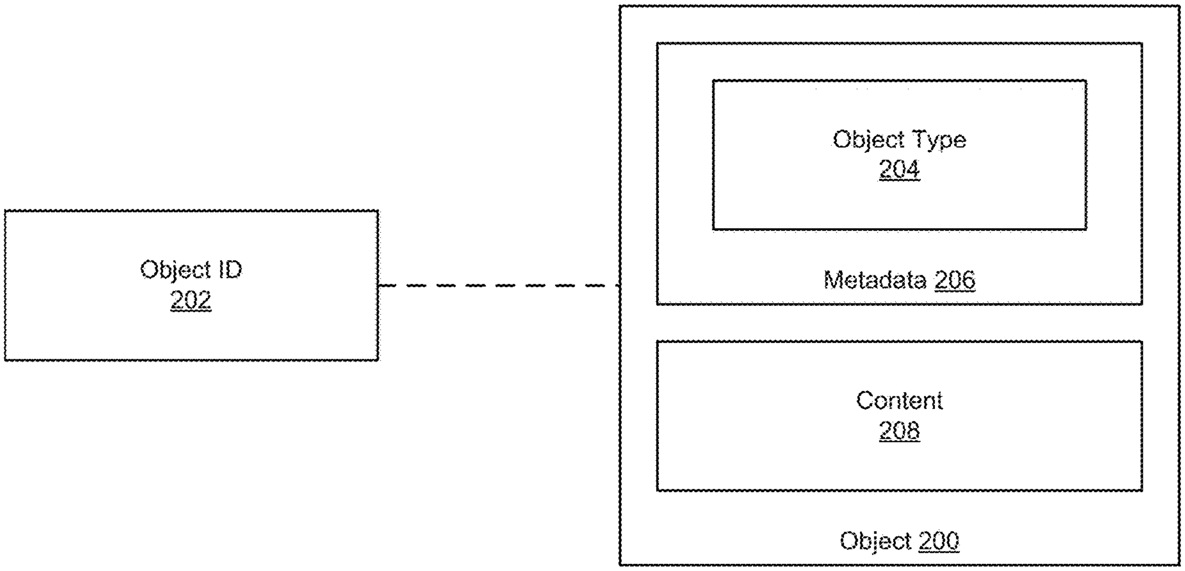
FIG. 2 shows an exemplary object in accordance with one or more embodiments of the technology.

FIG. 2 shows an exemplary object in accordance with one or more embodiments of the technology. The object (200) corresponds to a combination of content (208) and the metadata (206) associated with the content. The metadata (206) may include the object type (204) as well as any other metadata associated with the object. Examples of metadata may include, but are not limited to, author, content name, creation time, creation date, size of object, modification time, modification date, object format (i.e., the format of the content (208), e.g., portable document format (PDF), MPEG-4, .txt., etc.). With respect to the content, the content may correspond to any type of data that may be stored in the content repository. Examples of content may include, but are not limited to, text files, audio files, image files, and/or audio-visual files.

In one embodiment of the technology, each object (200) may be identified using an object ID (202). The object ID uniquely identifies the object in the content repository. The object ID may be any combination of numbers, letters, and symbols.

In one embodiment of the technology, the metadata and content associated with a given object may be stored in a single location. Alternatively, the metadata associated with an object may be stored in a first location and the content associated with a given object may be stored in a second location, where the first and second locations may be in the same or different content repositories.

Figure 3:
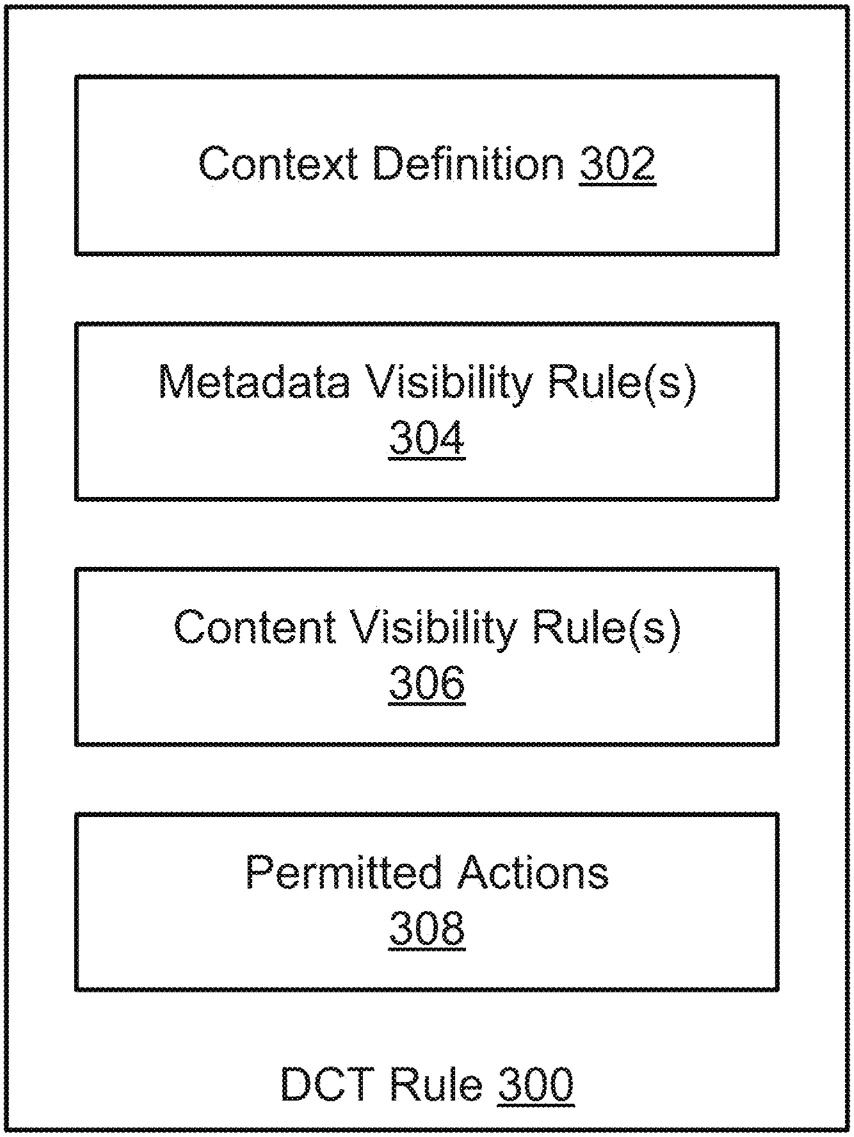
FIG. 3 shows an exemplary dynamic content type (DCT) rule specification in accordance with one or more embodiments of the technology.

FIG. 3 shows an exemplary dynamic content type (DCT) rule in accordance with one or more embodiments of the technology. Each DCT rule (300) includes a context definition (302) and may include one or more of the following: metadata visibility rules (304), content visibility rules (306), and permitted actions (308). Each of the components of the DCT rule is described below.

In one embodiment of the technology, the context definition (302) specifies when the DCT rule should be applied to service a request. Said another way, the context definition (302) specifies the context (associated with the request) for which the DCT rule applies. In one embodiment of the technology, the context definition may be defined using one or more regular expressions.

The context definition may be specified at any level of granularity. For example, the context definition may specify one or more of the following: (i) the object, e.g., using the object ID or using an expression (e.g., a regular expression) that may be used to identify the object (e.g., if content in the object is an audio-visual file); (ii) the action (or set of actions); (iii) a characterization associated with the source platform (i.e., the platform from which a request was issued (see e.g., FIG. 5, step 500)); (iv) a characterization associated with the source application (i.e., the application from which a request was issued (see e.g., FIG. 5, step 500)); (v) the user that issued the request; (vi) a characterization associated with a target platform (i.e., the platform on which the object will be viewed if the request is successfully serviced); (vii) source content repository (i.e., the content repository in which the object is currently stored); and (viii) target content repository (i.e., the content repository in which the object will be stored if the request is successfully serviced). The context definition may specify additional and/or other information without departing from the technology.

Continuing with the discussion of FIG. 3, the DCT rule may include metadata visibility rules (304). In one embodiment of the technology, the DCT rule may specify which metadata may be visible to the platform and/or application when the request is successfully serviced. For example, the metadata visibility rule may specify that when a given request is serviced based on the DCT rule only the content name and content format type may be visible.

Continuing with the discussion of FIG. 3, the DCT rule may include content visibility rules (306). In one embodiment of the technology, the DCT rule may specify which content may be visible to the platform and/or application when the request is successfully serviced. For example, the content visibility rule may specify that when a given request is serviced based on the DCT rule that specific portions (e.g., certain pages, certain words, certain sentences that include certain words, etc.) of the content are to be redacted.

Continuing with the discussion of FIG. 3, the DCT rule may include permitted actions (308). In one embodiment of the technology, the DCT rule may specify: (i) actions that may be performed on an object in the context (as defined by the context definition) and (ii) actions that the source application, source platform, or target platform may perform on an object that is retrieved in response to a request. For example, the permitted actions may specify that for the context (as defined by the context definition), a request to view the content in the object is permitted but a request to store the content in a different content repository is not permitted.

In another example, the permitted actions may specify that if an object is obtained in response to the servicing of a request (see FIG. 5), the content of the object may be viewed but not printed. In this example, the information about the permitted (or not permitted) actions may be sent to the source platform or source application (as defined above). Upon receipt of the above information, the source platform or source application may disable any features in the application that would enable a user to initiate actions that are not permitted. In the instant example, the source application may disable the printing functionality for the content associated with the retrieved object.

The DCT rule may specify additional or other information without departing from the technology.

FIGS. 4 and 5 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Turning to FIG. 4, FIG. 4 shows a method for configuring a system to use dynamic content types in accordance with one or more embodiments of the technology.

In step 400, a dynamic content type (DCT) is created within the object model. Once the DCT has been added to the object model, objects within the content repositories may be associated with the DCT.

While step 400 includes the creation of a DCT within the object model, the creation of the DCT does not require an immediate specification of any DCT rules. Rather, the DCT rules may be created at any time after the DCT is created within the object model. For example, some DCT rules may be specified at the time the DCT is created in the object model while other DCT rules may be specified after the content management system has been deployed (i.e., at run time). Further, DCT rules may be added, modified, and deleted at any point after the content management system has been deployed. Accordingly, following step 400, the process may proceed to step 402 or to step 406.

In step 402, one or more DCT rules (see FIG. 3) are obtained by the content management system. In one embodiment of the technology, the DCT rules may be obtained from one or more client systems, from a 3rd party (not shown), from a developer of the content management system, or from any other entity. In step 404, the DCT rules obtained in step 402 are provided to the DCT rules engine. Following step 404, the process may end or may proceed to step 406.

In step 406, the object type of one or more objects is set to DCT. In one embodiment of the technology, the object type for a given object may be set to DCT at the time the object is initially stored in a content repository. In one embodiment of the technology, the object type for a given object may be set to an object type that is not DCT when the object is initially stored in a content repository. Then at some later point in time the object type of the object may be changed to DCT.

FIG. 5 shows a method for servicing requests in accordance with one or more embodiments of the technology.

In step 500, a request is received by the content management service from a requesting entity (e.g., a client system). In one embodiment of the technology, the request includes an object ID and an action(s) to be performed on (or with) the object (or a portion thereof) associated with the object ID. The request may include additional information (e.g., parameters associated with the action) without departing from the technology. The action may correspond to any action that may be performed on any portion of the object (i.e., on the content or metadata, see e.g., FIG. 2). Examples of actions may include, but are not limited to, read, write, modify, delete, and move. In one embodiment of the technology, the request may include specify a set of objects using, e.g., object IDs or a regular expression.

In the event that the request specifies multiple objects and/or multiple actions, steps 502-512 may be performed for every <object ID, action> pair.

In step 502, the object type for the object (i.e., the object corresponding to the object ID) is obtained. In one embodiment of the technology, step 502 may include querying the content repository to locate the object corresponding to the object ID and then obtaining the metadata (including the object type) from the content repository.

In step 504, a determination is made about whether the object type for the object is DCT. If the object type for the object is DCT, then the process proceeds to step 508; otherwise, the process proceeds to step 506.

In step 506, a request which specifies an object, which has an object type that is not DCT, is processed by the content management system in accordance with the object model. Said another way, the request is serviced without invoking the DCT rules engine or any of the DCT rules. The result(s) generated by servicing the request is sent to the requesting entity (i.e., the entity that issued the request in step 500).

Returning to step 504, if the object type for the object is DCT, then the process proceeds to step 508. In step 508, the context associated with the request is determined (or otherwise obtained). The context associated with the request may include some or all of the following information: (i) object ID, (ii) source platform, (iii) source application, (iv) user information (i.e., which user initiated the request), (v) action being requested to be performed on the object, (vi) possible target platform if the request is successfully serviced, (vii) source content repository, (viii) possible target content repository if the request is successfully serviced; and (ix) object content format. The context may include different or additional information without departing from the technology. The context for the request may be determined using any known or later discovered mechanism.

In step 510, a DCT rule to be used to service the request is identified. In one embodiment of the technology, the DCT rule is identified by determining all DCT rules that have a context definition that matches the context determined in step 508. The most specific DCT rule, i.e., the DCT rule that includes the most granular context definition, is selected from the set of matching DCT rules as the DCT rule to be used to service the request. For example, consider a scenario in which DCT rule 1 includes a context definition that specifies the action and the source platform and DCT rule 2 that includes a context definition that specifies the object content format, the action, and the source platform. Further, assume that the context definitions in both DCT rule 1 and DCT rule 2 match the context associated with the request. In this example, DCT rule 2 would be selected to be used in servicing the request as DCT rule 2 is more specific than DCT rule 1.

In one embodiment of the technology, if there are no DCT rules that include context definitions that match the context determined in step 508, then a default DCT rule may be used to service the request.

In step 512, the request is serviced using the DCT rule identified in step 510. The result(s) of service the request is then sent to the requesting entity. In one embodiment of the technology, servicing the request may include: (i) determining whether the action in the request is permitted to be performed on the object based on the permitted action portion of the identified DCT rule; (ii) if the action can be performed on the object, then the action is performed on the object in accordance with any content visibility rules and metadata visibility rules specified in the DCT rule. For example, if the action is a view action and certain portions of the metadata of the object are not to be shown to the requesting entity (as specified in the metadata visibility rules) and certain portions of the content of the object are to be redacted (as specified in the content visibility rules), then the metadata and content for the object are obtained and modified prior to being provided to the requesting entity such that the requesting entity only is able to view the modified metadata and the modified content.

In one embodiment of the technology, while the DCT rule may require that the metadata and/or content is modified prior to it being provided to the requesting entity, the actual metadata and content may not be modified; rather, a copy of the metadata and/or content to be modified is created and the copy of the metadata and/or content is modified (per the DCT rule).

In one embodiment of the technology, the servicing of the request in step 512 may result additional objects being obtained (i.e., an object that is not identified in the request obtained in step 500). In such cases, any of the additional objects that are of object type DCT may be processed in accordance with FIG. 5 or may be processed using the same DCT rules as determined in step 510. Further, any of the additional objects that are not of object type DCT may be processed using the same DCT rules as determined in step 510.

The following section describes examples in accordance with one or more embodiments of the technology. The examples are not intended to limit the scope of the technology.

Example 1

Consider a scenario in which an object is stored in a first content repository that is categorized as "classified", where the object has an object type of DCT. At some point in time after the object has been stored in the first content repository, the content management service receives a request to move the object to a second content repository. Upon receipt of the request, the content management service determines that the object that is the subject of the request has an object type of DCT. Based on this determination, the content management service obtains the context for the request. In this example, the context of the request includes: (i) object ID; (ii) an action (i.e., a move action); (iii) a source content repository (i.e., the first content repository); and (iv) a possible target content repository (i.e., the second content repository) (which is determined based on the move action).

The DCT rules engine subsequently identifies DCT rule 1 based on the aforementioned context matching the content definition in the DCT rule. In this example, DCT rule 1 specifies: (i) if the target content repository is categorized as "classified" or "top secret" then the object may be moved to the target content repository without any modifications; and (ii) if the target content repository is not categorized as "classified" or "top secret" then various portions of the content (as specified in the DCT rule) are redacted and all metadata except the content format and the content name is removed from the metadata.

In the instant example, the second content repository is categorized as "unclassified." Accordingly, the metadata and content of the object are modified to obtain modified metadata and modified content. The modified metadata and modified content are then stored in a new object in the second content repository.

Example 2

Consider a scenario in which Bob is working on a company issued laptop on the company's private network. As part of this work, the Bob issues a request to view the metadata and content associated with an object, where the content in the object corresponds to a software design document for a new product.

Upon receipt of the request, the content management service determines that the object that is the subject of the request has an object type of DCT. Based on this determination, the content management service obtains the context for the request. In this example, the context of the request includes: (i) object ID, (ii) an action (i.e., a view action); (iii) Bob's assigned role 1; and (iv) source platform (i.e., company computer issuing request via company's private network).

The DCT rules engine subsequently identified DCT rule 2 based on the aforementioned context matching the content definition in the DCT rule. In this example, DCT rule 2 specifies: (i) when the source platform is categorized as "private" then users with role 1 (i.e., senior engineer) may view and print an un-redacted version of the content and all the metadata; (ii) when the source platform is categorized as "private" then users with role 2 (i.e., sales team) may view but not print or email an un-redacted version of the content and all the metadata; and (iii) when the source platform is categorized as "public" then users with role 1 and 2 may view a redacted version of the content and only the content name (i.e., they cannot view any other portion of the metadata).

In the instant example, Bob's request is serviced in response to DT Rule 2 (i) because Bob is at work using a work computer, the source platform characterized as "private". Accordingly, Bob may view an un-redacted copy of the content and metadata. However, if Bob were to make the same request using either his work computer at home via a public network or using his personal computer at work, Bob's request would be serviced in accordance with DCT rule 2 (iii) because in the source platform would be characterized as "public."

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method, comprising:

receiving, by a computer and from an application running on a requesting entity, a request for content, the request specifying an object identifier;

determining, by the computer, a context of the request for content, the determining comprising identifying a dynamic content type (DCT) rule containing a context definition that matches the context of the request for content, wherein the DCT rule is created at any time after a DCT is created in an object model, wherein the object model specifies how to interact with DCT objects managed by a content management system, and wherein the DCT rule specifies an action;

determining, by the computer based on the object identifier, an object managed by the content management system;

performing, by the computer, the action specified by the DCT rule on the object or a portion thereof, wherein performing the action on the object or the portion thereof produces information about the action; and communicating, by the computer, the information about the action to the application running on the requesting entity.

2. The method according to claim 1, further comprising:

determining whether an object type for the object is DCT, wherein the action is performed responsive to the object type for the object being DCT.

3. The method according to claim 1, wherein the DCT rule is determined by:

determining a set of DCT rules having a respective context definition that matches the context of the request for content; and selecting the DCT rule from the set of DCT rules based on a level of granularity of the respective context definition.

4. The method according to claim 1, wherein the context definition specifies at least one of:

(i) the object identifier, (ii) a source platform of the requesting entity;

(iii) the application running on the requesting entity;

(iv) information of a user who initiated the request for content;

(v) a requested action;

(vi) a target platform;

(vii) a source content repository;

(viii) a target content repository; or (ix) an object content format.

5. The method according to claim 1, wherein the DCT rule specifies which metadata is visible to a source platform of the requesting entity, to the application running on the requesting entity, or both, responsive to the request for content being successfully serviced.

6. The method according to claim 1, wherein the DCT rule specifies which content is visible to a source platform of the requesting entity, to the application running on the requesting entity, or both, responsive to the request for content being successfully serviced.

7. The method according to claim 6, wherein the DCT rule further specifies which specific portion of the content is to be redacted.

8. A content management system, comprising:

a processor;

a non-transitory computer-readable medium; and instructions stored on the non-transitory computer-readable medium and translatable by the processor for:

receiving, from an application running on a requesting entity, a request for content, the request specifying an object identifier;

determining a context of the request for content, the determining comprising identifying a dynamic content type (DCT) rule containing a context definition that matches the context of the request for content, wherein the DCT rule is created at any time after a DCT is created in an object model, wherein the object model specifies how to interact with DCT objects managed by the content management system, and wherein the DCT rule specifies an action;

determining, based on the object identifier, an object managed by the content management system;

performing the action specified by the DCT rule on the object or a portion thereof, wherein performing the action on the object or the portion thereof produces information about the action; and communicating the information about the action to the application running on the requesting entity.

9. The content management system of claim 8, wherein the instructions are further translatable by the processor for:

determining whether an object type for the object is DCT, wherein the action is performed responsive to the object type for the object being DCT.

10. The content management system of claim 8, wherein the DCT rule is determined by:

determining a set of DCT rules having a respective context definition that matches the context of the request for content; and selecting the DCT rule from the set of DCT rules based on a level of granularity of the respective context definition.

11. The content management system of claim 8, wherein the context definition specifies at least one of:

(i) the object identifier, (ii) a source platform of the requesting entity;

(iii) the application running on the requesting entity;

(iv) information of a user who initiated the request for content;

(v) a requested action;

(vi) a target platform;

(vii) a source content repository;

(viii) a target content repository; or (ix) an object content format.

12. The content management system of claim 8, wherein the DCT rule specifies which metadata is visible to a source platform of the requesting entity, to the application running on the requesting entity, or both, responsive to the request for content being successfully serviced.

13. The content management system of claim 8, wherein the DCT rule specifies which content is visible to a source platform of the requesting entity, to the application running on the requesting entity, or both, responsive to the request for content being successfully serviced.

14. The content management system of claim 13, wherein the DCT rule further specifies which specific portion of the content is to be redacted.

15. A computer program product having a non-transitory computer-readable medium storing instructions translatable by a processor of a content management system for:

receiving, from an application running on a requesting entity, a request for content, the request specifying an object identifier;

determining a context of the request for content, the determining comprising identifying a dynamic content type (DCT) rule containing a context definition that matches the context of the request for content, wherein the DCT rule is created at any time after a DCT is created in an object model, wherein the object model specifies how to interact with DCT objects managed by the content management system, and wherein the DCT rule specifies an action;

determining, based on the object identifier, an object managed by the content management system;

performing the action specified by the DCT rule on the object or a portion thereof, wherein performing the action on the object or the portion thereof produces information about the action; and communicating the information about the action to the application running on the requesting entity.

16. The computer program product of claim 15, wherein the instructions are further translatable by the processor for:

determining whether an object type for the object is DCT, wherein the action is performed responsive to the object type for the object being DCT.

17. The computer program product of claim 15, wherein the DCT rule is determined by:

determining a set of DCT rules having a respective context definition that matches the context of the request for content; and selecting the DCT rule from the set of DCT rules based on a level of granularity of the respective context definition.

18. The computer program product of claim 15, wherein the context definition specifies at least one of:

(i) the object identifier, (ii) a source platform of the requesting entity;

(iii) the application running on the requesting entity;

(iv) information of a user who initiated the request for content;

(v) a requested action;

(vi) a target platform;

(vii) a source content repository;

(viii) a target content repository; or (ix) an object content format.

19. The computer program product of claim 15, wherein the DCT rule specifies which metadata is visible to a source platform of the requesting entity, to the application running on the requesting entity, or both, responsive to the request for content being successfully serviced.

20. The computer program product of claim 15, wherein the DCT rule specifies which content is visible to a source platform of the requesting entity, to the application running on the requesting entity, or both, responsive to the request for content being successfully serviced and wherein the DCT rule further specifies which specific portion of the content is to be redacted.

* * * * *